(12) United States Patent
Nielsen et al.

(10) Patent No.: US 11,098,695 B2
(45) Date of Patent: Aug. 24, 2021

(54) SYSTEM AND METHOD TO MANAGE TORSIONAL OSCILLATION OF A WIND TURBINE TOWER

(71) Applicant: VESTAS WIND SYSTEMS A/S, Aarhus (DK)

(72) Inventors: Thomas S. Bjertrup Nielsen, Randers (DK); Fabio Caponetti, Åbyhøj (DK); Keld Hammerum, Hadsten (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 137 days.

(21) Appl. No.: 16/494,643

(22) PCT Filed: Mar. 20, 2018

(86) PCT No.: PCT/DK2018/050049
§ 371 (c)(1),
(2) Date: Sep. 16, 2019

(87) PCT Pub. No.: WO2018/171852
PCT Pub. Date: Sep. 27, 2018

(65) Prior Publication Data
US 2020/0088165 A1    Mar. 19, 2020

(30) Foreign Application Priority Data
Mar. 21, 2017   (DK) .............................. PA201770196

(51) Int. Cl.
*F03D 7/02* (2006.01)
*F03D 9/25* (2016.01)
(Continued)

(52) U.S. Cl.
CPC .......... *F03D 7/0296* (2013.01); *F03D 7/0224* (2013.01); *F03D 9/25* (2016.05); *F03D 17/00* (2016.05); *F03D 7/043* (2013.01)

(58) Field of Classification Search
CPC .......... F03D 7/0296; F03D 9/25; F03D 17/00; F03D 7/0224; F03D 7/043
See application file for complete search history.

(56) References Cited

U.S. PATENT DOCUMENTS

| 4,435,647 A | 3/1984 | Harner et al. |
|---|---|---|
| 2010/0111693 A1 | 5/2010 | Wilson |

(Continued)

FOREIGN PATENT DOCUMENTS

| CN | 101627207 A | 1/2010 |
|---|---|---|
| CN | 203756432 U | 8/2014 |

(Continued)

OTHER PUBLICATIONS

Chinese Office Action for Application No. 201880019735.5 dated Apr. 28, 2020.
(Continued)

*Primary Examiner* — Viet P Nguyen
(74) *Attorney, Agent, or Firm* — Patterson + Sheridan, LLP

(57) ABSTRACT

A wind turbine comprising a tower, a nacelle, a rotor including a plurality of blades, an electrical generator operatively coupled to the rotor, and a control system. The control system comprises: a sensing system operable to output a signal indicative of the torsional oscillation frequency of the nacelle; a torsional damping module configured to monitor the torsional oscillation signal and to determine one or more blade pitch command signals for damping the torsional oscillation of the tower, and a filter module configured to receive the one or more blade pitch command signals as inputs and to output a respective one or more modified blade pitch command signals, wherein the filter module is configured to filter the one or more blade pitch command input signals to exclude frequency components greater than the torsional oscillation frequency. Aspects of the invention also
(Continued)

relate to a method, a computer program software product and a controller for implementing the method.

19 Claims, 5 Drawing Sheets

(51) Int. Cl.
*F03D 17/00* (2016.01)
*F03D 7/04* (2006.01)

(56) References Cited

U.S. PATENT DOCUMENTS

| | | |
|---|---|---|
| 2012/0257967 A1 | 10/2012 | Egedal et al. |
| 2015/0003894 A1 | 1/2015 | Legg |
| 2015/0308139 A1 | 10/2015 | Wagner |
| 2016/0356266 A1* | 12/2016 | Koerber ............... F03D 7/0296 |

FOREIGN PATENT DOCUMENTS

| | | |
|---|---|---|
| DE | 102007063082 A1 | 6/2009 |
| EP | 2225461 A1 | 9/2010 |
| EP | 2713048 A2 | 4/2014 |
| WO | 2018171852 A1 | 9/2018 |

OTHER PUBLICATIONS

PCT International Search Report for Application PCT/DK2018/050049 dated Feb. 7, 2018.
Danish Patent and Trademark Office 1st Technical Examination for Application No. PA 2017 70196 dated Sep. 21, 2017.
PCT Written Opinion of the International Searching Authority for Application No. PCT/DK2018/050049 dated Feb. 7, 2018.

* cited by examiner

SYSTEM AND METHOD TO MANAGE TORSIONAL OSCILLATION OF A WIND TURBINE TOWER

TECHNICAL FIELD

The present invention relates to a technique, strategy or method for reducing oscillatory motion of a nacelle of a wind turbine, and a system for implementing that method.

BACKGROUND

Wind turbines are being designed ever larger due to the economic and political incentives to increase energy production from renewable resources. Moreover, since wind speeds are generally greater at higher altitudes, it is sometimes desirable to increase the hub height of a wind turbine in an effort to access a higher average wind speed and more stable wind conditions.

There are significant challenges involved with designing a wind turbine with an increased hub height. It is generally not feasible to scale-up the typical steel tubular wind turbine tower to heights in excess of 100 m due to engineering practicalities and costs. Therefore, the trend has been towards lighter weight towers, for example, based on latticework or space-frame construction principles, or lighter tubular steel construction. In order to provide the necessary stability of these types of towers, it is common for them be steadied or guyed with cables. Thus, such structures are often referred to as 'guyed' or 'cable stayed' towers and serve the need for increased hub heights whilst reducing costs.

However, these relatively light-weight towers have markedly different structural properties to the more common steel tubular towers which can cause an implementation challenge. In particular, the torsional stiffness of cable stayed towers is relatively low when compared to the more common steel tubular towers and this can result in the tower being excited at or near to its torsional eigenfrequency by the movement of the rotor during operation. Excessive torsional excitation of the tower should be avoided since it can lead to excess structural stress, yaw errors and other issues.

One approach to address this issue is discussed in US2016/0356266-A1 in which a pitch control system implements blade pitch activity to counter the angular oscillations of the nacelle. It is against this background that the invention has been devised.

SUMMARY OF THE INVENTION

In a first aspect, the invention provides a wind turbine comprising a tower, a nacelle, a rotor including a plurality of blades, an electrical generator operatively coupled to the rotor, and a control system. The control system comprises:
 a sensing system operable to output a signal indicative of the torsional oscillation frequency of the nacelle;
 a torsional damping module configured to monitor the torsional oscillation signal and to determine one or more blade pitch command signals for damping the torsional oscillation of the tower, and
 a filter module configured to receive the one or more blade pitch command signals as inputs and to output a respective one or more modified blade pitch command signals, wherein the filter module is configured to filter the one or more blade pitch command input signals to exclude frequency components greater than the torsional oscillation frequency, wherein the filter defines a cut off frequency equal to a 4P frequency of the wind turbine.

The invention also embraces a method of controlling a wind turbine comprising a tower, a rotor including a plurality of blades, an electrical generator operatively coupled to the rotor. The method comprises:
 monitoring a torsional oscillation frequency that indicates the yaw motion of the nacelle,
 determining one or more blade pitch command signals for damping the torsional oscillation of the tower, and
 filtering the one or more blade pitch command signals so as to generate one or more modified blade pitch command signals, wherein, in filtering the one or more blade pitch command, those signals are filtered to exclude frequency components greater than the torsional oscillation frequency, wherein the filter defines a cut off frequency equal to a 4P frequency of the wind turbine.

The invention can also be expressed as a computer program product downloadable from a communication network and/or stored on a machine readable medium, comprising program code instructions for implementing a method as defined above, and also as controller for a wind turbine system including a nacelle mounted on a tower, a rotor having a plurality of blades, wherein the controller includes a processor, a memory module, and an input/output system, and wherein the memory module includes a set of program code instructions which when executed by the processor, implements a method as defined above.

Beneficially, the invention serves to damp torsional oscillation of the wind turbine nacelle and tower whilst reducing pitch activity.

The step of determining the blade pitch command signals may include multiplying a torsional moment reference signal with a modulation signal based on the azimuth angle of the rotor. The torsional moment reference signal may be determined from the torsional oscillation signal.

In filtering the blade pitch commands signals to exclude frequency content above the torsional oscillation frequency, the filter module may defined a cut off frequency that is equal to a selected frequency greater than the torsional oscillation frequency. The cut off frequency being the 4P frequency.

The torsional damping module may implement a gain such that the magnitude of the one or mode blade pitch command signals is proportional to the magnitude of the magnitude of the torsional oscillation of the tower. That gain may be variable in dependent on an operating parameter of the wind turbine. Thus, this provides control over the degree of damping provided by the damping module. The operating parameter may be selected from at least one of: wind speed; rotor speed; torsional oscillation frequency, blade pitch angle, generated power, commanded power reference.

The invention is particularly applicable to wind turbines having towers over 100 m in height, and particularly those which require stabilisation cables, guy lines; so called 'cable-stayed' towers.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

The invention will now be described in detail, by way of example only, with reference to the accompanying drawings, in which.

DETAILED DESCRIPTION

Specific embodiments of the invention will now be described in which numerous features will be discussed in detail in order to provide a thorough understanding of the inventive concept as defined in the claims. However, it will be apparent to the skilled person that the invention may be put in to effect without the specific details and that in some instances, well known methods, techniques and structures have not been described in detail in order not to obscure the invention unnecessarily.

Figure 1:
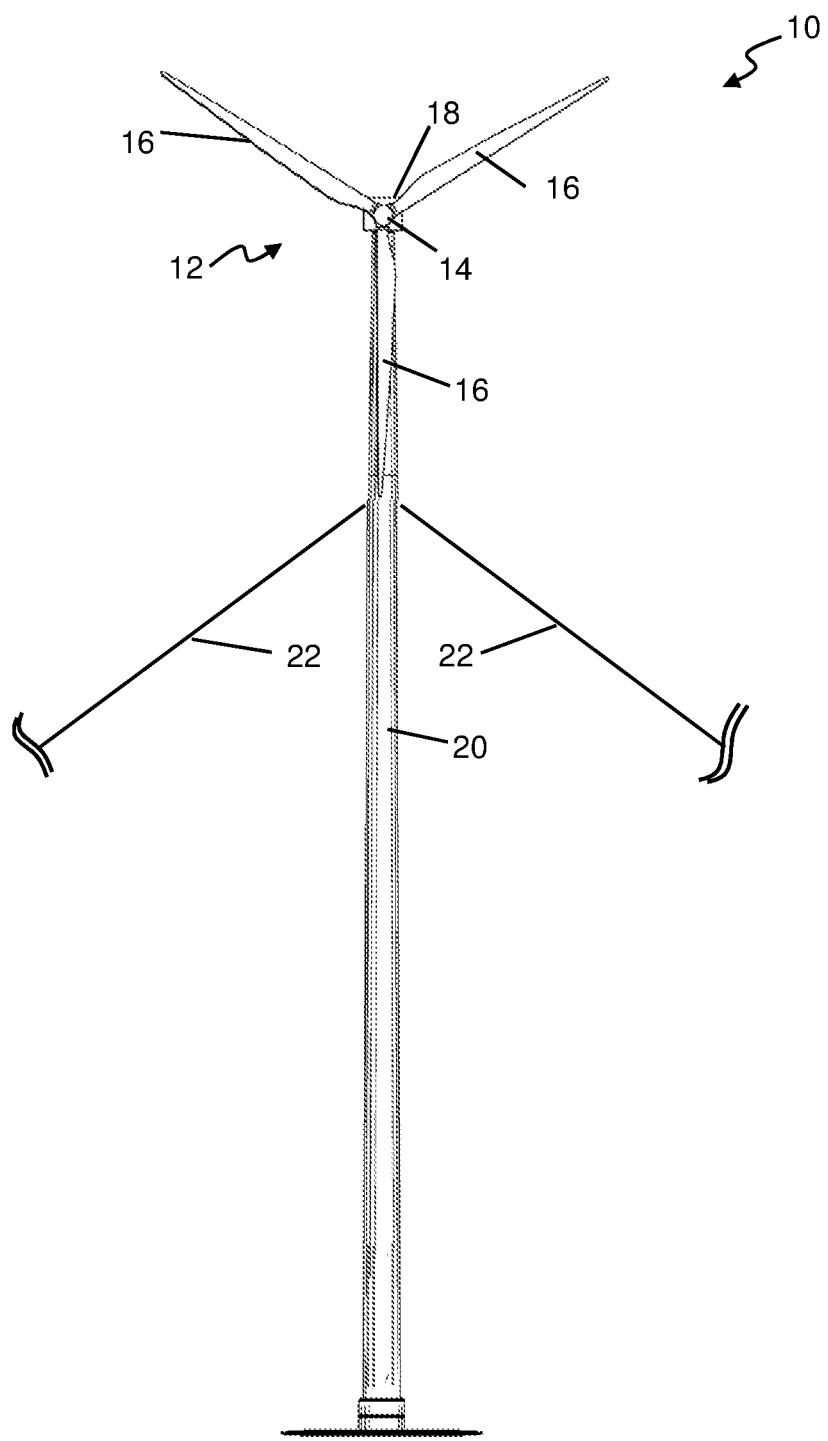
FIG. 1 is a front view of a wind turbine within which the embodiments of the invention may be incorporated.

In order to place the embodiments of the invention in a suitable context, reference will firstly be made to FIG. 1. Here, a wind turbine 10 according to one embodiment of the invention comprises a rotor 12 including a hub 14 to which is attached three wind turbine blades 16. The rotor 12 is rotatably supported by a nacelle 18 that is mounted to the top of a tower 20 in the usual way. The nacelle 18 houses and supports various power generating components of the wind turbine 10, as will be described in more detail later. As is known, the flow of wind acting on the blades 16 drives the rotor 12 which in turn drives the power generation equipment housed in the nacelle 18. The power generation equipment is shown in more detail in FIG. 2. It should be noted that the tower 20 is comparatively tall and slim, and is depicted as an example of a cable-stayed tower. For this purpose, therefore, guy lines or wires 22 are attached to an upper portion of the tower and extend away from the tower in a downward direction for attachment to respective anchors (not shown) that are coupled to an appropriate support; for example they may be embedded in the ground. The guy lines 22 are shown only partly here, but the presence of the anchors is implied and would be understood by the skilled person.

The wind turbine 10 illustrated in FIG. 1 is an onshore wind turbine, although the invention may equally be applied to an offshore wind turbine. Here, the wind turbine is a horizontal axis type (HAWT), which is a common type of system, although other types exist to which the invention is also applicable.

Figure 2:
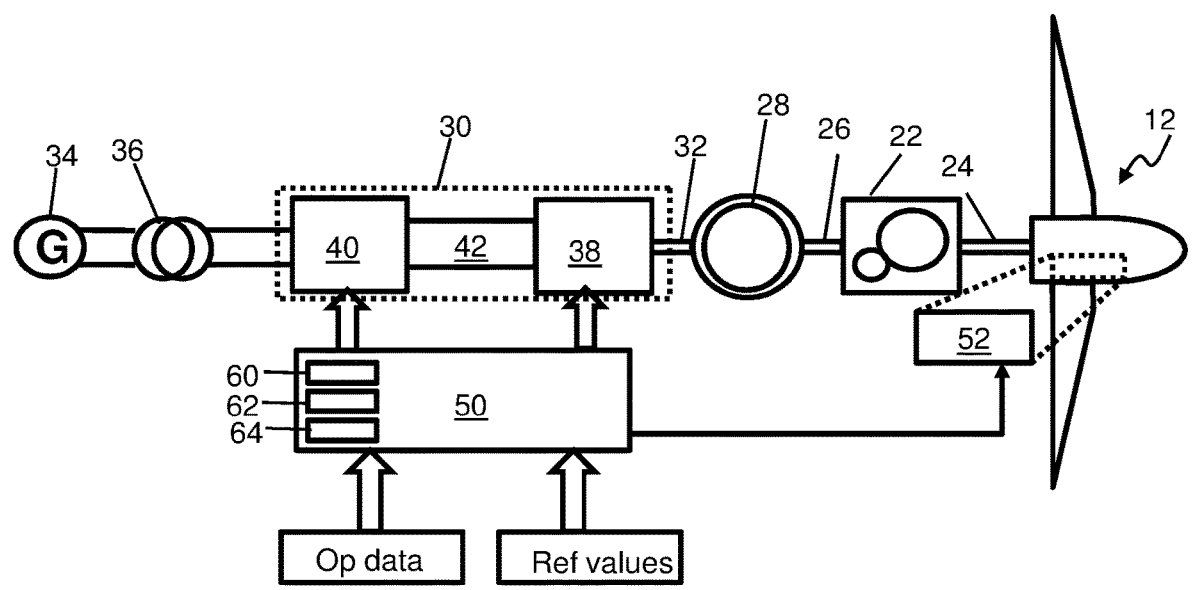
FIG. 2 is a systems view of the wind turbine in FIG. 1, which illustrates an example of a power generation and control architecture suitable for the embodiments of the invention.

FIG. 2 illustrates an example of a power generation system architecture which gives context to the invention, as will become apparent. Represented schematically as a system diagram, the wind turbine 'system' includes features that are significant for this discussion, but it should be appreciated that many other conventional features are not shown here for brevity, for example yaw control equipment, control network, cooling equipment, local power distribution network and so on. However, the skilled person would understand that these features would be present in a practical implementation, and so their presence is implied. Also it should be noted that the specific architecture discussed here is used as an example to illustrate the technical functionality of the invention, and so the invention may be implemented by a system having a different specific architecture.

Returning to the figure, the rotor 12 drives a transmission 22 by way of an input drive shaft 24. Although the transmission 22 is shown here in the form of a gearbox, it is also known for wind turbines to have direct-drive architectures which do not include a gearbox. The transmission 22 has an output shaft 26 which drives a generator 28 for generating electrical power. Three phase electrical power generation is usual in utility scale wind turbine systems, for example in excess of 1 MW power output, but this is not essential for the purpose of this discussion.

The generator 28 is connected to a frequency converter 30 by a suitable three-phase electrical connector such as a cable or bus 32. The frequency converter 30 is of conventional architecture and, as is known, converts the output frequency of the generator 28 to a voltage level and frequency that is suitable for supplying to an electrical grid 34 via a transformer 36. It will be appreciated that the specific architecture described here is a two-level back-to-back full-scale power converter (FSC) system, which includes a generator-side converter 38 and a grid side converter 40 which are coupled via a DC link 42. The general architecture of such a system is conventional and will not be described in more detail. Furthermore, the skilled person will understand that the specific architecture in FIG. 2 is provided by way of example only and other architectures are known, such as doubly-fed induction generator-based systems (DFIG).

Although fixed-speed wind turbines are appropriate for wind turbines having a comparatively low power output, for example of below 1 MW, in this embodiment the wind turbine system 2 is able to operate at variable speed so as to be more efficient at capturing energy from the wind at a wind range of wind speeds. The invention is, however, also suitable for use in a fixed-speed wind turbine.

As is known, variable-speed wind turbines typically operate under two main control strategies: below-rated power and above-rated power. As is known, the term 'rated power' is used here in its accepted sense to mean the power output at which the wind turbine system is rated or certified to produce under continuous operation. Similarly, the use of the term 'rated wind speed' should be understood to mean the lowest wind speed at which the rated power of a wind turbine is produced.

Below rated power occurs at wind speeds between the cut-in speed and rated wind speed which, typically, is between 10 and 17 m/s. In this operating region, the wind turbine system is operable to control the rotor speed so as to maximise the energy captured form the wind. This is achieved by controlling the rotor speed so that the tip speed ratio is at an optimum value, namely between 6 and 7. To control the rotor speed, the wind turbine system is provided the facility to control the generator torque so as to track a power reference, as will be described.

Above-rated power occurs when the wind speed has increased to, or has exceeded, the rated wind speed. In this operating condition, the objective of the wind turbine system 2 is to maintain a constant output power. This is achieved by controlling the generator torque to be substantially constant, so as to track a constant power reference, but varying the pitch angle of the blades which adjusts the resulting lift and drag force of the blade in the rotor plane. This will slow down the turbine's rotational speed or the torque transferred to the rotor shaft so that the rotational speed, and also the generated power of the system, is kept constant below a set threshold.

In order to achieve the power control objectives discussed above, the wind turbine also comprises a control system 50. In general, the functionality of a wind turbine control system is well known in the art, but a brief discussion is provided here to provide a functional overview and suitable context to the invention.

In overview the role of the control system 50 is to monitor the operational state of the wind turbine and to optimise the production and delivery of electrical power to the grid, whilst avoiding operational conditions that may pose a risk to the structural and functional integrity of the wind turbine. The control system 50 comprises suitable hardware and software to implement necessary functionality to control the wind turbine. As would be known to the skilled person, the control system comprises a suitable processing platform including a processor 60 that is in communication with a suitable RAM/ROM memory module 62. The processor 60 is also in communication with an input/output module 64 which may also incorporate suitable communication functionality. It will be appreciated that the processor 60 is therefore operable to implement the required software functionality and uses the memory module 62 for this purpose.

Broadly, the control system 50 receives a set of measured operational parameters, such as wind information (speed, shear, direction), rotor speed, generator speed and so on, and a set of reference values, which may include a torque reference, a power reference, and a speed reference. In response to the measured operational parameters and the reference values, the control system 50 controls the power converter 30 and a pitch control system 52 in order to deliver the generated active and reactive power levels that are required of the wind turbine by a higher level control entity, for example a grid operator or a power plant controller, if the wind turbine forms part of a power plant. As is known to the skilled person, a pitch control system 52 is a common feature in a wind turbine system and acts to control the angle of attack of the blades relative to the wind and thereby regulating the torque generated by the rotor on the generator at a wide range of rotor speeds. Such pitch control systems may include hydraulic or electrically driven pitch control actuators which are operable to rotate the blades angularly about their major axis, with respect to the hub to which they are mounted. Since the operation of a pitch control system is so well known, a detailed explanation will not be provided here.

Figure 3:
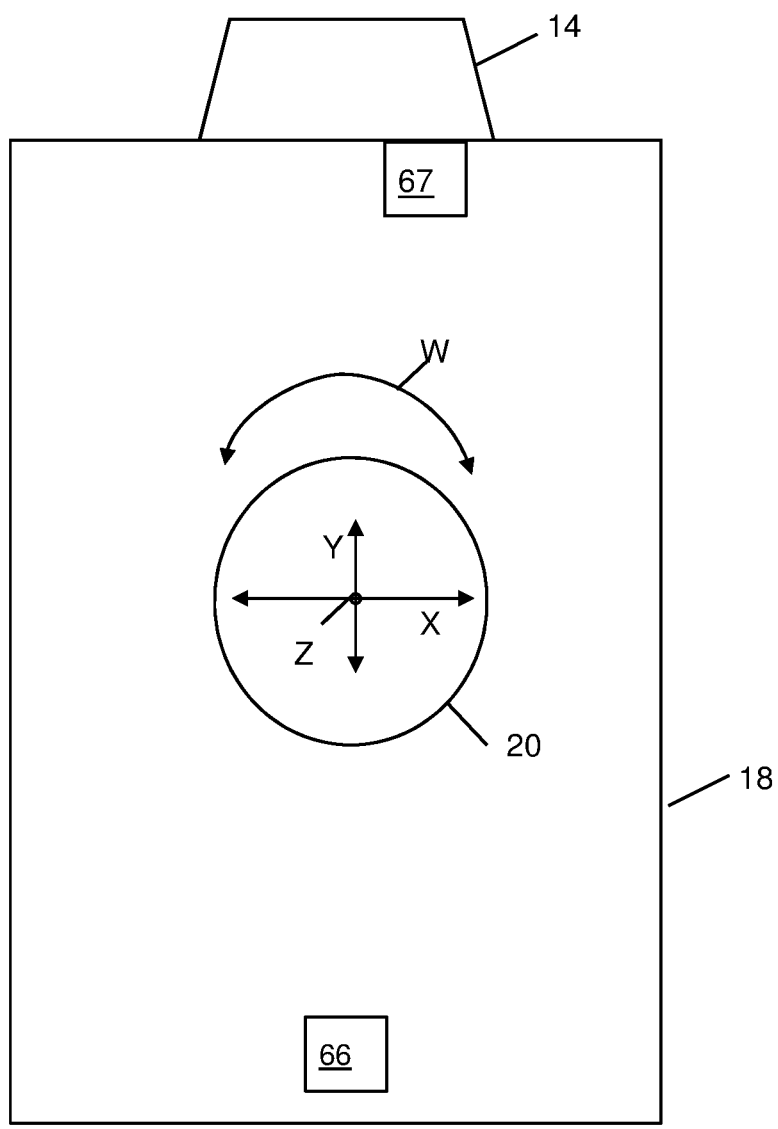
FIG. 3 is a schematic view of the wind turbine nacelle, which amongst other things shows the main oscillation modes of the wind turbine.

Having described the technology platform on which the invention may be implemented, embodiments of the invention will now be described in more detail. As will be appreciated from the above discussion, the wind turbine 10 is of the cable-stayed type, and so will tend to exhibit relatively low torsional rigidity. This means that the tower 20, and therefore the nacelle 18, will have a tendency to oscillate angularly, i.e. to yaw, about a tower axis 'Z' under various sources of excitation, for example due to wind shear across the rotor disc. This is shown by arrow 'W' in FIG. 3. It will be appreciated that this yaw mode of vibration will usually be accompanied by other modes of vibration which may manifest themselves in an overall oscillatory motion of the nacelle during use, the precise motion depending on the conditions in which the wind turbine in operating. For example, typically the tower may oscillate in the fore-aft direction, which may be driven by wind gusts, for example, and also in the transverse or side-to-side direction, which may be driven by an unbalanced rotor. The longitudinal mode of oscillation is generally aligned with the longitudinal axis Y of the nacelle 18, whereas the side-to-side mode of oscillation is generally aligned with the transverse axis X.

Figure 4:
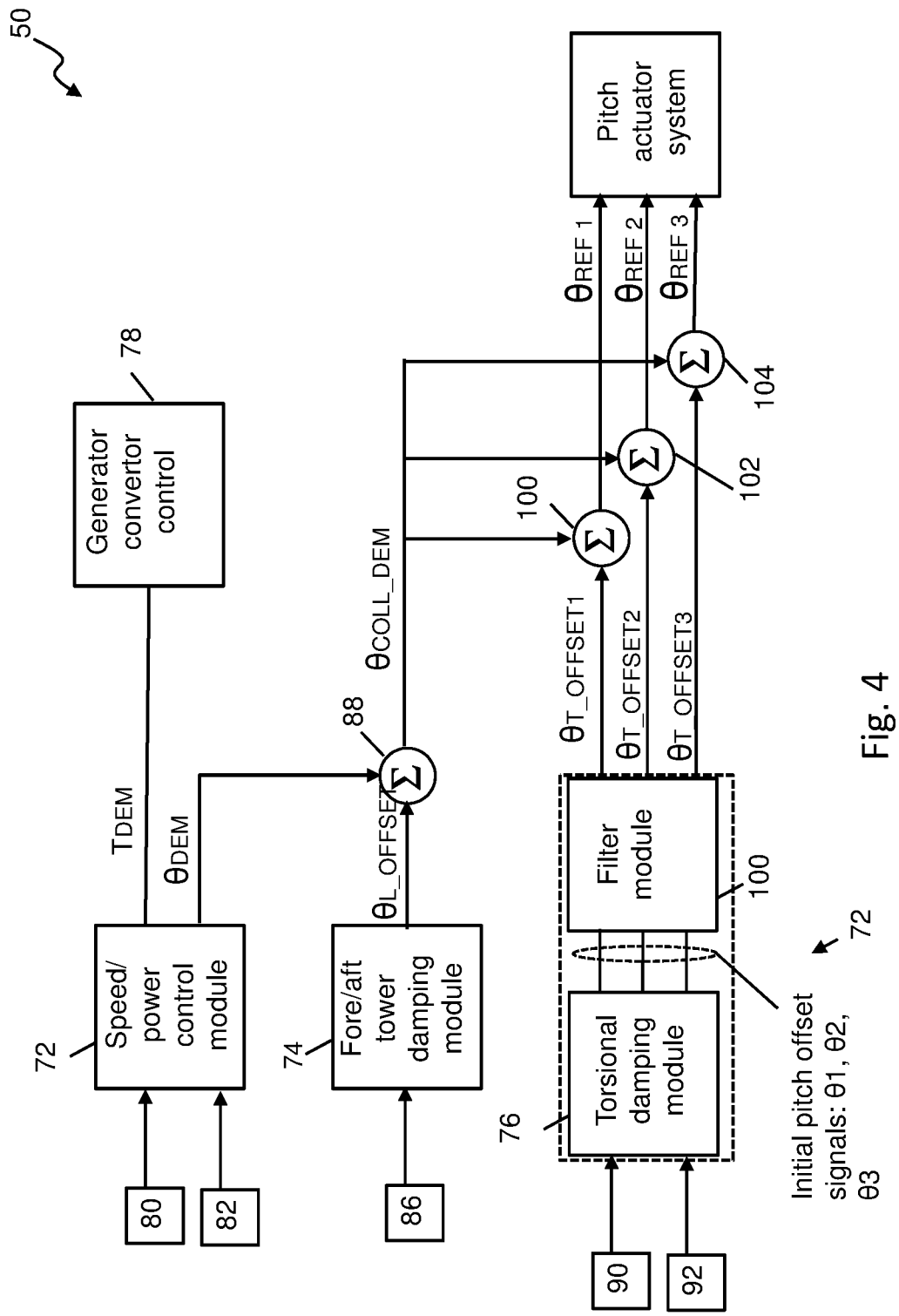
FIG. 4 is a more detailed illustration of the control architecture of an embodiment of the invention.

In order to control the oscillations of the tower, the control system 50 is equipped with an active damping system 70, as will be described in further detail later with reference also to FIG. 4. The active damping system 70 is operable to counteract the oscillations in selected ones of the oscillatory modes identified above, based on the needs of the particular environmental installation of the wind turbine. Here, the control system 50 includes functionality to counteract motion in more than one of the oscillatory modes identified above, although this is not essential and, instead, functionality to address a single oscillatory mode may be provided.

In order to take action to reduce nacelle oscillation, the damping system is provided with a sensor system for detecting that motion. Typically such a sensor system would be located in the tower top or in the nacelle itself. Various sensing methodologies would be suitable for measuring tower top movement. For example, tower top oscillation may be estimated accurately based on suitable acceleration sensors located in the tower top or the nacelle. Other measurement systems may be used such as inertial measurement units, based on gyroscopic sensors, or even mechanical stain/load sensors in the tower, for example. All of such system provide signals that are indicative of the oscillation frequency of the tower, either through direct measurement or indirect measurement where oscillation frequency is inherent in the signal and may be calculated from that signal by suitable techniques, such as differentiation of the signal. In order to detect the oscillatory movement of the tower, the acceleration sensor should have sensitivity at low frequencies, for example in the range of 0.1-1.0 Hz. Higher frequencies that are not of interest can be filtered out. Such a sensing system 66 is illustrated schematically in FIG. 3. Although multi-axis gyro devices such as 3-axis IMUs (inertial measurement units) may be used, single-axis devices may also be used to detect motion in a particular plane of motion. Rate gyros may have particular utility here, since they indicate the rate of change of angle with time. For example, in accordance with this embodiment, a single axis gyro device, a rate gyro for example, may be used to measure torsional movement, and particular rate of angular change, about the Z axis of the nacelle.

In general, active damping oscillatory motion in wind turbines is known technology. For example, as mentioned above US2016/0356266 proposes a system to reduce yaw oscillations in a lattice-work tower. Another example is described in US2008/206051.

However, some implementations of existing systems may increase pitch actuator activity which will also increase wear of the associated pitch components such as drive motors, gearing parts, blade bearings, and so on. It is desirable to limit the increase in pitch activity through the use of active damping systems, so as to mitigate maintenance costs of repairing or replacing worn components.

As mentioned above, FIG. 4 depicts the control system 50 in detail, and shows specific functionality of the control system in functional blocks. As is conventional, the functionality of each functional block is illustrated here separately merely for convenience, and the skilled person would appreciate that such separation is not essential for the purposes of implementing such functionality within a suitable software environment.

In overview, the control system 50 includes a speed control module 72, a longitudinal damping module 74 and a torsional damping module 76. Also included is a converter control module 78 which is responsible for implementing control of the machine- and line-side power converters 38, 40 to influence the torque exerted on the rotor by the generator 28, and the pitch control system 52.

It should be noted at this point that the architecture of a wind turbine speed control system that acts through power converter electronics to control generator power, and thereby the reaction torque on the rotor via the gearbox, and also acts through a pitch control system to control the pitch angle of the blades is generally known in the art, so a detailed description of the electronic architecture will not be given here.

The speed control module 72 receives a plurality of control inputs, but two input parameters are shown specifically here: a rotor speed input parameter 80 which is provided by a suitable rotor speed sensor (e.g. an encoder), and a demanded power input parameter 82 or 'power reference' which typically would be provided by a higher level controller (not shown) of the wind turbine either directly to the speed control module 72 or through a data distribution network based on a suitable protocol, such as ethernet.

The speed control module 72 is operable to control the generator torque, which is associated with, and calculated from, the power reference, by outputting a demanded torque signal $T_{DEM}$ to the converter control module 78 during below-rated power operating conditions in order to minimise the error between the rotor speed input parameter 80 and the power reference 82 and, therefore, to track the power reference. Similarly, at operating conditions above-rated power, the speed control module 72 is operable to hold the generator torque constant (and, therefore to track the constant power reference) but to output a control signal to the pitch control system 52 to modulate, collectively, the pitch angles of all three blades of the rotor. This signal is shown as $\theta_{DEM}$ in FIG. 4. As will be described, the pitch demand or 'pitch reference' signal $\theta_{DEM}$ output by the speed control module 72 is modulated by further control algorithms before finally being implemented by the pitch control system 52.

The longitudinal motion damping module 74 and the torsional damping module 76 in this embodiment are operable to complement the functionality of the speed controller 22 by modifying the pitch demand signal from the speed control module 72 so as to damp different oscillatory motions of the tower. Optionally, a lateral motion damping module may also be provided, although such functionality has not been described here for brevity. Both of these damping modules 74, 76 operate together via the pitch control system 24 to control the pitch adjustment commands for the blades, as will now be explained. Advantageously, the damping functionality may be operable substantially continuously during operation of the wind turbine, or its operation may be selected during certain operating conditions.

The longitudinal motion damping module 74 functions to damp the oscillations of the tower in a direction in line with the rotor axis; that is to say the 'fore-aft' motion of the tower. In order to do this, the module 74 receives, as an input signal, an acceleration parameter 86 from the sensing system 66 that is configured to measure the longitudinal acceleration of the nacelle or tower top along the longitudinal axis Y, as in FIG. 3.

The longitudinal motion damping module 74 calculates the collective pitch change, thereby inducing a change in thrust, required to cause the rotor to apply a force to the nacelle that is counter to the fore-aft motion. Thus, the longitudinal motion damping module 74 outputs a collective pitch offset $\theta_{L\_OFFSET}$ that is added to the collective pitch demand $\theta_{DEM}$ signal that is output by the speed controller 72 at summing junction 88. The modulated collective pitch demand $\theta_{COLL\_DEM}$ is then further modulated by the torsional damping module 76.

The collective pitch demand $\theta_{COLL\_DEM}$ output from summing junction 88 is input to three respective summing junctions 100, 102, 104 which combine the collective pitch demand signal $\theta_{COLL\_DEM}$ with individual or 'cyclic' pitch offsets that are output from the torsional damping module 76. These three signals are identified as $\theta_{T\_OFFSET1}$, $\theta_{T\_OFFSET2}$, and $\theta_{T\_OFFSET3}$ in respect of each blade of the wind turbine. In this context the skilled person would understand that each blade will be identified by a respective blade number, i.e. blade 1, blade 2, blade 3, with the rotational angle of the rotor being taken with reference to a specific one of the blades, usually being blade 1. The output signal of the summing junctions 100-104 are thus individual pitch control references for each blade of the wind turbine which combine the collective pitch changes required to apply a counter thrust to the rotor to reduce fore-aft swaying motion of the tower, together with cyclic thrust changes in order address torsional oscillations. Each of the individual pitch references are labelled $\theta_{REF1}$, $\theta_{REF2}$, and $\theta_{REF3}$ in FIG. 4 and are input to the pitch actuator system 52 which includes its own respective control algorithms to drive the pitch actuators so as to follow the demanded pitch references.

The above discussion has explained how the pitch control inputs from the speed control module 72, the longitudinal motion damping module 74 and the torsional damping module 76 are combined so as to result in individual pitch references provided to the pitch actuator system. The operation of the torsional damping module 76 will now be described in more detail.

As has been mentioned, the function of the torsional damping module 76 is to monitor the motion of the tower and/or the nacelle, specifically the yaw mode of oscillation, and to determine pitch inputs that work to reduce that oscillatory motion of the nacelle. To achieve this, the torsional damping module 76 receives two input signals: a yaw motion signal 90 and a rotor azimuth signal 92. The yaw motion signal may be provided by the sensor system 66 located in the nacelle, whilst the rotor azimuth signal may be provided by a suitable rotor position sensing system 67, for example as could be achieved using an encoder or Hall sensing. This is illustrated schematically in FIG. 3. Note that such a rotor position sensing system is conventional in wind turbine technology and so a full discussion will not be provided here for the sake of clarity.

Firstly, using the nacelle yaw motion signal 90 from the sensing system 66, the torsional damping module 76 computes a torsional moment reference $T_{REF}$, which represents the desired counter-torque to act against the yaw movement of the tower. Following this, the torsional damping module 76 determines individual pitch reference offsets for each blade that will result in the desired counter-torque. It will be appreciated that the desired torque will have to be modulated onto the rotational motion of the blades about the rotor axis.

In determining the desired pitch reference offsets $\Delta\theta_k$, where k denotes the blade number of the wind turbine (k=1,2,3), the following expression is used, in this embodiment:

$$\Delta\theta_k = T_{ref} \cdot \cos\left(\psi(t) + \frac{2\pi k}{3}\right) \quad 1)$$

In the above expression, $\psi(t)$ is the azimuth angle of the rotor, and it will be apparent that the torsional moment reference $T_{REF}$ will be multiplied with respect to the angular rotation of the rotor. Now, it should be appreciated that the torsional moment reference $T_{REF}$ will, in this embodiment, have a frequency content of 3P, that is to say that the torsional moment reference will be a varying signal with a frequency of approximately three times the rotational frequency of the rotor due to the mechanism by which the yaw moment is generated, for example each blade passing through a region on wind shear associated with the rotor disc.

In steady state conditions, $\psi(t)$ is equal to a steady rotational frequency of the wind turbine, which can be considered to be the 1P frequency.

Figure 5:
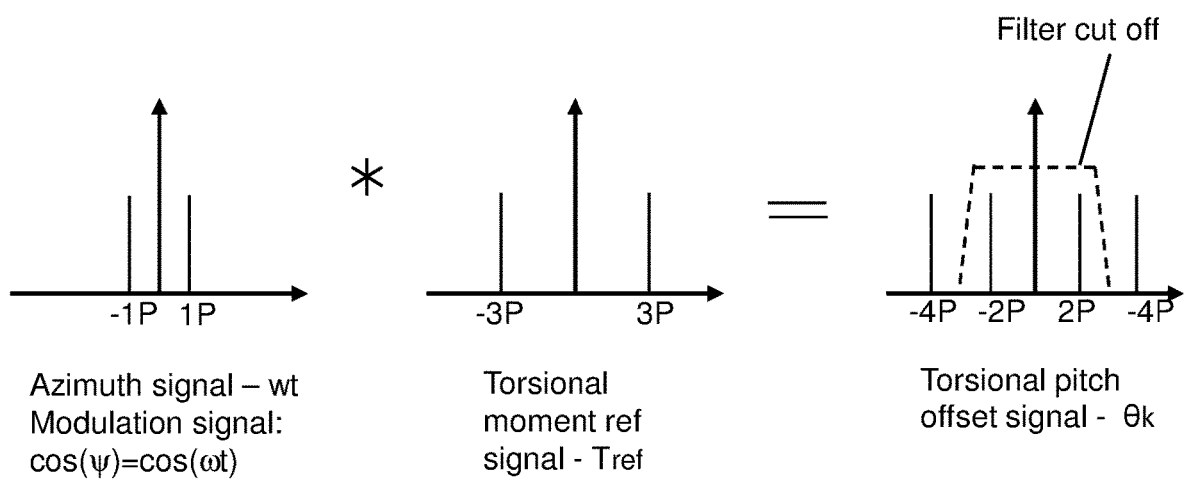
FIG. 5 is a diagram to illustrate the convolution of two signals in the frequency domain.

FIG. 5 represents the azimuth signal, the torsional moment reference signal, and the resulting pitch offset signal in the frequency domain for a better understanding. When considered in the frequency domain, the convolution of a 3P signal onto a 1P modulation signal means that the resulting signal, that is the pitch offset signal, has a frequency content that is split with two lobes, at 2P and 4P frequencies. In practice, this means that the pitch offset signal has some relatively high frequency content that resides at frequencies above the torsional yaw movement, which is at 3P. The result of this is that the torsional offset signal will, when implemented in the pitch control system, cause a relative high pitch activity in the pitch actuators. So, although this approach would be successful in counteracting the torsional yaw movement of the nacelle, it would be at the expense of increased pitch activity.

In order to reduce the effects of this, a filter module 100 is provided which filters the torsional pitch offset signals from the torsional damping module 76 prior to forwarding the signals to the pitch actuation system 52. At this point it should be noted that the filter module 100 is shown as a separate functional block. However, this is not essential and the filter functionality could instead be incorporated into the functionality of the torsional damping module 76.

As will be appreciated, the filter module 100 is configured to receive the three blade pitch offset signals θ1, θ2, θ3 as inputs and to output respective three modified blade pitch offset signals i.e. $\theta_{T\_OFFSET1}$, $\theta_{T\_OFFSET2}$ and $\theta_{T\_OFFSET3}$ The modified blade pitch offset signals are then input to summing junctions 100-104 where they are added to the respective pitch signals $\theta_{COLL\_DEM}$ as derived from the speed control module 72 and the longitudinal damping module 74.

The filter module 100 is configured to filter the blade pitch command input signals to exclude frequency components greater than the torsional oscillation frequency. In this case, since the rotor includes three blades, and since the torsional oscillation frequency tends towards a 3P frequency, then the filter module 100 is configured to remove the 4P component from the signal. More generally, the filter module 100 is configured to remove frequency content greater than the torsional oscillation frequency.

Activation of the functional modules of the damping system may be achieved in different ways. For example, activation of each damping module may be triggered only after their oscillatory mode of interest has been detected as exceeding a predetermined threshold. Activating the damping modules in this way may reduce the activity of the pitch control system.

Furthermore, activation of the damping modules 74,76 may be achieved by integrated gain variables embedded into their respective control algorithms. For example, those gains could be variable based on certain monitored operating parameters of the wind turbine such that as the operating point of the wind turbine increases, then the gains of the damping algorithm also increase. Examples of the operating parameters that could be monitored are: wind speed, rotor speed, blade pitch angle, torsional oscillation frequency, generated power and commanded power reference.

Having described above specific embodiment of the inventive concept, the skilled person would appreciate that various modifications could be made to those embodiments without departing form the inventive concept, as defined by the claims.

The invention claimed is:

1. A wind turbine comprising:
    a tower;
    a nacelle;
    a rotor including a plurality of blades;
    an electrical generator operatively coupled to the rotor; and
    a control system comprising:
        a sensing system operable to output a torsional oscillation signal indicative of a torsional oscillation frequency of the nacelle;
        a torsional damping module configured to:
            monitor the torsional oscillation signal; and
            determine one or more blade pitch command signals for damping a torsional oscillation of the tower; and
        a filter module configured to:
            receive the one or more blade pitch command signals as inputs:
            filter the one or more blade pitch command signals to exclude frequency components greater than the torsional oscillation frequency, wherein the filter module defines a cut off frequency equal to a 4P frequency of the wind turbine; and
            output a respective one or more modified blade pitch command signals.

2. The wind turbine of claim 1, wherein determining the one or more blade pitch command signals includes:
    multiplying a torsional moment reference signal with a modulation signal based on an azimuth angle of the rotor.

3. The wind turbine of claim 1, wherein determining the one or more blade pitch command signals includes:
    calculating a cyclic blade pitch input for each blade of the plurality of blades in order to generate a moment on the rotor that is out of phase with the torsional oscillation signal.

4. The wind turbine of claim 1, wherein the control system is configured to control a pitch actuation system of the wind turbine based on the one or more modified blade pitch command signals.

5. The wind turbine of claim 1,
    wherein the sensing system includes a sensor mounted in the nacelle or in a top of the tower of the wind turbine, and wherein the sensing system is arranged to determine a yaw movement of the nacelle.

6. The wind turbine of claim 1, wherein the torsional damping module is operable to damp the torsional oscillation of the tower when the torsional oscillation is detected to exceed a predetermined threshold.

7. The wind turbine of claim 1, wherein the torsional damping module implements a gain such that the magnitude of the one or mode blade pitch command signals is proportional to the magnitude of the torsional oscillation of the tower.

8. The wind turbine of claim 7, wherein the gain is dependent on an operating parameter of the wind turbine.

9. The wind turbine of claim 8, wherein the operating parameter is at least one of: a wind speed, a rotor speed, a torsional oscillation frequency, a blade pitch angle, a generated power, or a commanded power reference.

10. The wind turbine of claim 1, wherein the tower has a height exceeding 100 meters.

11. The wind turbine of claim 1, wherein the tower is steadied by guy lines.

12. A method of controlling a wind turbine comprising a tower, a nacelle, a rotor including a plurality of blades, and an electrical generator operatively coupled to the rotor, wherein the method comprises:
    monitoring a torsional oscillation frequency that indicates a yaw motion of the nacelle;
    determining one or more blade pitch command signals for damping a torsional oscillation of the tower; and
    filtering, by a filter, the one or more blade pitch command signals so as to generate one or more modified blade pitch command signals,
    wherein, in filtering the one or more blade pitch command signals, those signals are filtered to exclude frequency components greater than the torsional oscillation frequency, wherein the filter defines a cut off frequency equal to a 4P frequency of the wind turbine.

13. The method of claim 12, wherein determining the one or more blade pitch command signals includes:
    multiplying a torsional moment reference signal with a modulation signal based on an azimuth angle of the rotor.

14. The method of claim 12, wherein determining the one or more blade pitch command signals includes:
    calculating a cyclic blade pitch input for each blade of the plurality of blades in order to generate a moment on the rotor that is out of phase with the torsional oscillation signal.

15. The method of claim 12, further comprising:
    controlling a pitch actuation system of the wind turbine based on the one or more modified blade pitch command signals.

16. A controller for a wind turbine system including a nacelle mounted on a tower, and a rotor having a plurality of blades, wherein the controller comprises:
    a processor;
    a memory module; and
    an input/output interface,
    wherein the memory module includes a set of program code instructions which when executed by the processor, performs an operation comprising:
        monitoring a torsional oscillation frequency that indicates a yaw motion of the nacelle;
        determining one or more blade pitch command signals for damping a torsional oscillation of the tower;
        filtering, by a filter, the one or more blade pitch command signals so as to generate one or more modified blade pitch command signals,
        wherein, in filtering the one or more blade pitch command signals, those signals are filtered to exclude frequency components greater than the torsional oscillation frequency, wherein the filter defines a cut off frequency equal to a 4P frequency of the wind turbine.

17. The controller of claim 16, wherein determining the one or more blade pitch command signals includes:
    multiplying a torsional moment reference signal with a modulation signal based on an azimuth angle of the rotor.

18. The controller of claim 16, wherein determining the one or more blade pitch command signals includes:
    calculating a cyclic blade pitch input for each blade of the plurality of blades in order to generate a moment on the rotor that is out of phase with the torsional oscillation signal.

19. The controller of claim 16, wherein the input/output interface is coupled to a pitch actuation system of the wind turbine operable based on the one or more modified blade pitch command signals.

* * * * *